United States Patent
Djordjevic et al.

(10) Patent No.: US 9,094,125 B2
(45) Date of Patent: Jul. 28, 2015

(54) MULTIDIMENSIONAL CODED-MODULATION FOR HIGH-SPEED OPTICAL TRANSPORT OVER FEW-MODE FIBERS

(71) Applicant: NEC Laboratories America, Inc., Princeton, NJ (US)

(72) Inventors: Ivan B. Djordjevic, Tucson, AZ (US); Lei Xu, Princeton Junction, NJ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 13/901,766

(22) Filed: May 24, 2013

(65) Prior Publication Data
US 2014/0205283 A1 Jul. 24, 2014

Related U.S. Application Data

(60) Provisional application No. 61/651,191, filed on May 24, 2012.

(51) Int. Cl.
*H04B 10/12* (2006.01)
*H04B 10/04* (2006.01)
(Continued)

(52) U.S. Cl.
CPC .......... *H04B 10/2581* (2013.01); *H04B 10/516* (2013.01); *H04L 1/0041* (2013.01)

(58) Field of Classification Search
CPC . H04L 27/3411; H04L 1/0003; H04L 1/0057; H04L 1/0071; H04L 1/1893; H04L 1/0041; H04B 10/2581; H04B 10/516; H04J 14/06; H03M 13/116; H03M 13/255; H03M 13/2957; H03M 13/3905; H03M 13/3972; H03M 13/6331

USPC ............................ 398/44, 140–143, 182–214
See application file for complete search history.

(56) References Cited

U.S. PATENT DOCUMENTS 6,473,878 B1 * 10/2002 Wei ................................ 714/755
7,876,670 B2 * 1/2011 Li et al. ......................... 370/206
(Continued)

OTHER PUBLICATIONS

O'Sullivan, Alternating Minimization Algorithms From Blahut Arimoto to Expectation Maximization, 1998, Codes Curves and Signals, Springer, pp. 173-192.*
(Continued)

*Primary Examiner* — Ken Vanderpuye
*Assistant Examiner* — Dibson Sanchez
(74) *Attorney, Agent, or Firm* — Joseph Kolodka

(57) ABSTRACT

Systems and methods for data transport are provided which encode streams of data using low density parity check (LDPC) encoders and map data streams to symbols, by assigning bits of symbols to a signal constellation and associating bits with constellation points. Constellation points are generated using a D-dimensional optimum signal constellation design (OSCD) method. The OSCD determines an optimum source distribution for an optical channel, generates D-dimensional training sequences from the optimum source distribution, determines new signal constellation points as the center of mass for each D-dimensional cluster of points, and repeats these steps until convergence or until a predetermined number of iterations is reached. Coordinates obtained by the D-dimensional OSCD method are stored in a look-up-table (LUT), points are selected from the LUT using encoded data streams, coordinates are input into a D-dimensional modulator after digital-to-analog conversion (DAC), and a modulated signal is transmitted over an optical medium.

7 Claims, 6 Drawing Sheets

(51) Int. Cl.
*H04B 10/06* (2006.01)
*H04B 10/2581* (2013.01)
*H04B 10/516* (2013.01)
*H04L 1/00* (2006.01)

(56) References Cited

U.S. PATENT DOCUMENTS

| | | | | |
|---|---|---|---|---|
| 8,793,551 | B2* | 7/2014 | Zhou et al. | 714/752 |
| 8,811,509 | B2* | 8/2014 | Shen et al. | 375/264 |
| 2005/0190868 | A1* | 9/2005 | Khandekar et al. | 375/346 |
| 2006/0212776 | A1* | 9/2006 | Koslov et al. | 714/759 |
| 2008/0163025 | A1* | 7/2008 | Djordjevic et al. | 714/755 |
| 2008/0294968 | A1* | 11/2008 | Djordjevic et al. | 714/801 |
| 2009/0052907 | A1* | 2/2009 | Batshon et al. | 398/182 |
| 2009/0199065 | A1* | 8/2009 | Djordjevic et al. | 714/752 |
| 2009/0228766 | A1* | 9/2009 | Djordjevic et al. | 714/780 |
| 2009/0282314 | A1* | 11/2009 | Djordjevic et al. | 714/755 |
| 2009/0297144 | A1* | 12/2009 | Djordevic et al. | 398/39 |
| 2009/0310700 | A1* | 12/2009 | Liu et al. | 375/267 |
| 2010/0050048 | A1* | 2/2010 | Djordjevic et al. | 714/755 |
| 2010/0211849 | A1* | 8/2010 | Djordjevic et al. | 714/755 |
| 2010/0215371 | A1* | 8/2010 | Djordevia et al. | 398/79 |
| 2010/0232804 | A1* | 9/2010 | Djordjevic et al. | 398/152 |
| 2011/0085624 | A1* | 4/2011 | Djordjevic et al. | 375/341 |
| 2012/0051452 | A1* | 3/2012 | Djordjevic et al. | 375/295 |
| 2012/0263466 | A1* | 10/2012 | Djordjevic et al. | 398/65 |
| 2013/0091398 | A1* | 4/2013 | Djordjevic et al. | 714/752 |
| 2013/0139024 | A1* | 5/2013 | Nguyen et al. | 714/752 |
| 2014/0129895 | A1* | 5/2014 | Petrov | 714/752 |
| 2014/0205283 | A1* | 7/2014 | Djordjevic et al. | 398/44 |

OTHER PUBLICATIONS

T. Mizuochi: Y. Miyata, K. Kubo, T. Sugihara, K. Onohara, and H. Yoshida, "Progress in Soft-Fecision FEC," in Proc. OFC/NFOEC, Los Angeles, CA, Mar. 2011, 3 pages.

O. A. Sab and V. Lemaire, "Block Turbo Code Performances for Long-Haul DWDM Optical Transmission Systems," in Proc. OFC/NFOEC, Baltimore, MD, Mar. 2000, 4 pages.

K. Onohara, T. Sugihara. Y. Konishi, Y. Miyata, T. Inoue: S. Kametani, K. Sogihara, K. Kubo, H. Yoshida, and T. Mizuochi, "Soft-Decision-Based Forward Error Correction for 100 Gb/s Transport Systems," J. Selected Topics in Quantum Electron, Sep. 2010, vol. 16, pp. 1258-1267.

I. B. Djordjevic, M. Cvijetic, L. Ku, and T. Wang, "Using LDPC-Coded Modulation and Coherent Detection for Ultra High-Speed Optical Transmission," IEEE/OSA J. Lightwave Technol., Nov. 2007, vol. 25, pp. 3619-3625.

M. Arabaci, I. B. Djordjevic, R. Saunders, and R. M. Marcoccia, "Nonbinary Quasi-Cyclic LDPC Based Coded Modulation for Beyond 100 Gb/s Transmission," IEEE Photon. Technol. Lett., Mar. 2010, vol. 22. pp. 434-436.

I. B. Djordjevic, L. Xu. and T. Wang, "Statistical Physics Inspired Energy-Efficient Coded-Modulation for Optical Communications," Optics Letters, Apr. 15, 2012, vol. 37, No. 8, pp. 1340-1342.

I. B. Djordjevic, L. Xu, and T. Wang, "Multidimensional Hybrid Modulations for Ultra-High-Speed Optical Transport," IEEE Photonics Journal, 2011, vol. 3, No. 6, pp. 1030-1038.

I. B. Djordjevic, "Energy-efficient Spatial-Domain-Based Hybrid Multidimensional Coded-Modulations Enabling Multi-Tb/s Optical Transport," Optics Express, Aug. 15, 2011. vol. 19, No. 17, pp. 16708-16714.

I. B. Djordjevic, M. Arabaci, L. Xu, and T. Wang, "Spatial-Domain-Based Multidimensional Modulation for Multi-Tb/s Serial Optical Transmission," Optics Express, Mar. 28, 2011, vol. 19, No. 7, pp. 6845-6857.

I. B. Djordjevic, M. Arabaci, L. Xu, and T. Wang, "Generalized OFDM (GOFDM) for Ultra-High-Speed Optical Transmission," Optics Express, Mar. 28, 2011, vol. 19, No. 7, pp. 6969-6979.

I. Djordjevic, H. G. Batshon, L. Ku, and T. Wang, "Four-Dimensional Optical Multiband-OFDM for Beyond 1.4 Tb/s Serial Optical Transmission," Optics Express, Jan. 17, 2011, vol. 19. No. 2, pp. 876-882.

H. G. Batshon, I. B. Djordjevic, T. Schmidt, "Ultra High Speed Optical Transmission Using Subcarrier-Multiplexed Four-Dimensional LDPC-Coded Modulation," Optics Express, Sep. 13, 2010, vol. 18, No. 19, pp. 20546-20551.

H. G. Batshon, I. B. Djordjevic, L. Xu, and T. Wang, "Modified Hybrid Subcarrier/Amplitude/Phase/Polarization LDPC-Coded Modulation for 400 Gb/s Optical Transmission and Beyond," Optics Express, Jun. 21, 2012, vol. 18, No. 13, pp. 14108-14113.

* cited by examiner

MULTIDIMENSIONAL CODED-MODULATION FOR HIGH-SPEED OPTICAL TRANSPORT OVER FEW-MODE FIBERS

RELATED APPLICATION INFORMATION

This application claims priority to provisional application Ser. No. 61/651,191 filed on May 24, 2012, the entirety of which is herein incorporated by reference.

BACKGROUND

1. Technical Field

The present invention relates to coded modulation, and more particularly, to multidimensional coded modulation based on D-dimensional optimum signal constellation design (OSCD).

2. Description of the Related Art

In recent years, there has been a strong impetus for Dense Wavelength Division Multiplexing (DWDM) networks to upgrade from 10 Gb/s per channel to 40/100 Gb/s per channel. Optical transmissions at 100 Gb/s Ethernet data rate has been standardized by ITU-T and IEEE forums. Such transmission rate demand has pushed optical communication systems to a 100 Gb/s Ethernet (100 GbE) standard, with 400 GbE and 1 Tb/s Ethernet (1 TbE) under consideration. While there are technologies that may potentially be used to deliver optical TbE, there remains a number of practical implementation costs and complexity challenges. For example, polarization division multiplexed (PDM) quadrature amplitude modulation (QAM) requires huge QAM constellations to reach Tb/s-range with commercially available symbol rates. Moreover, the terabit optical Ethernet will be affected not only by limited bandwidth of information-infrastructure, but also by its energy consumption.

SUMMARY

A method for optical data transport, comprising encoding one or more streams of input data using one or more low density parity check (LDPC) encoders; mapping one or more encoded data streams to symbols, wherein the mapper is configured to assign bits of the symbols to a signal constellation and to associate the bits of the symbols with signal constellation points; generating the signal constellation points using a D-dimensional optimum signal constellation design (OSCD) method, wherein D is an integer. The D-dimensional OSCD further comprises the following steps: determining a D-dimensional optimum source distribution for a given optical channel using an Arimoto-Blahut algorithm; generating D-dimensional training sequences from the optimum source distribution, with the D-dimensional training sequences being split into D-dimensional clusters of points; determining new signal constellation points as the center of mass for each D-dimensional cluster of points; and repeating the above steps until convergence or until a predetermined number of iterations has been reached. The method further comprises storing coordinates obtained by the D-dimensional OSCD method for a plurality of optical OSNR values in a look-up-table (LUT); selecting a point from the LUT using encoded data streams; inputting the coordinates into a D-dimensional modulator after digital-to-analog conversion (DAC); and transmitting a modulated signal over a fiber-optic medium of interest.

A transmitter, comprising one or more LDPC encoders configured to encode one or more streams of input data; a mapper configured to map one or more encoded data streams to symbols, wherein the mapper is configured to assign bits of the symbols to a signal constellation and to associate the bits of the symbols with signal constellation points, wherein a constellation diagram is obtained by employing an OSCD method; and a D-dimensional modulator toe perform electro-optical conversion based on signal constellation points from LUT obtained by OSCD.

A receiver configured to decode D-dimensional OSCD mapped data upon reception of signal from optical fiber, the receiver further comprising a demodulator configured to receive a modulated, encoded input stream and detect symbols in the input stream, wherein the demodulator is configured to demodulate a signal constellation formulated using a D-dimensional OSCD; a demultiplexer configured to demultiplex D-dimensional OSCD mapped data; an a posteriori probability (APP) demapper configured to calculate log likelihood ratios (LLRs); and one or more LDPC decoders configured to decode the LLRs.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
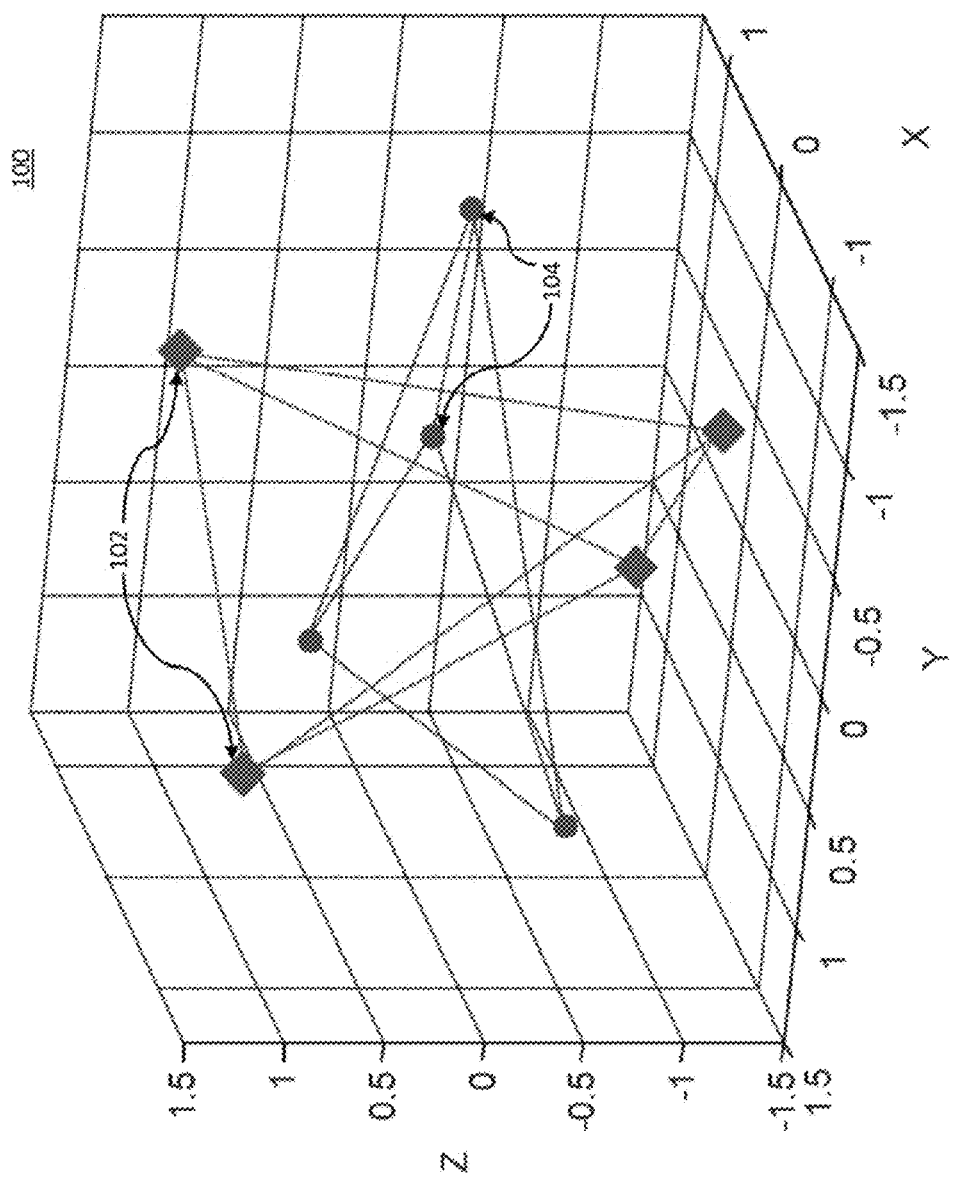
FIG. 1 is a diagram illustratively depicting an 8-ary 3-dimensional optical signal constellation in accordance with an embodiment of the present principles.

In accordance with the present principles, systems and methods are provided to enable a fiber based (e.g., few-mode fiber (FMF)) ultra high-speed (e.g., 400 Gb/s, 1 Tb/s) serial optical transmission based on D-dimensional signal constellations which may be obtained by minimization of mean-square error (MSE) of signal constellations representing a source for an optimum source distribution. The optimum source distribution may be obtained by maximizing channel capacity, based on the Arimoto-Blahut algorithm. Therefore, the signal constellations are optimum in the minimum MSE (MMSE) sense, and the method according to the present principles may be called a multidimensional/N-dimensional MMSE-optimum signal constellation design (ND-OSCD). Alternatively, for non-Gaussian channels instead of minimizing the MSE, the log-likelihood function should be maximized during the optimization procedure.

In accordance with the present principles, a multidimensional coded modulation (CM) system and method which enables ultra-high speed optical transport is provided, and may be called hybrid as it employs all available degrees of freedom, including both electrical and optical ones. The present system and method may employ in-phase/quadrature (I/Q) channels, two spin angular momentum (SAM) states (polarization states) and N Orbital Angular Momentum (OAM) states resulting in D=4N-dimensional signal-space. By increasing the number of OAM states, the aggregate data rate of the system may be increased while ensuring reliable transmission at these ultra-high speeds using capacity-approaching low density parity check (LDPC) codes. In addition, to increase the aggregate data rate, a D-dimensional space may provide larger Euclidean distances between signal constellation points when compared to a conventional two-dimensional (2D) state, which may result in improved bit error rate (BER) performance. It is contemplated that more than two electrical basis functions (e.g., orthogonal subcarriers, modified orthogonal polynomials) may be employed according to the present principles to further increase the signal-space.

In one embodiment, a FMF based fiber optic transmission system, which uses turbo equalization at the receiver side to compensate for mode group delay and mode dependent loss effects may be employed according to the present principles. Alternatively, conventional equalization approaches, be in time- or frequency-domain, may be used to compensate for linear components of mode coupling. The multiple input multiple output (MIMO) can also be used to compensate for linear components of mode coupling effects. Further, the MIMO signal processing can be combined with orthogonal frequency division multiplexing (OFDM). This ND-OSCD system and method significantly outperforms conventional systems and methods (e.g., polarization-division multiplexed-quadrature amplitude modulation (PDM-QAM)), and the ND-OSCD constellations further outperform constellations obtained by other methods (e.g., sphere packing method).

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, an 8-ary 3-dimensional optimum signal constellation 100 is illustratively depicted according to one embodiment of the present principles. The four diamond-shaped points 102 and the four spherical-shaped points 104 form two tetrahedrons cross each other. In one embodiment according to the present principles, the energy of every point is the same, and the points exhibit symmetric properties.

Figure 2:
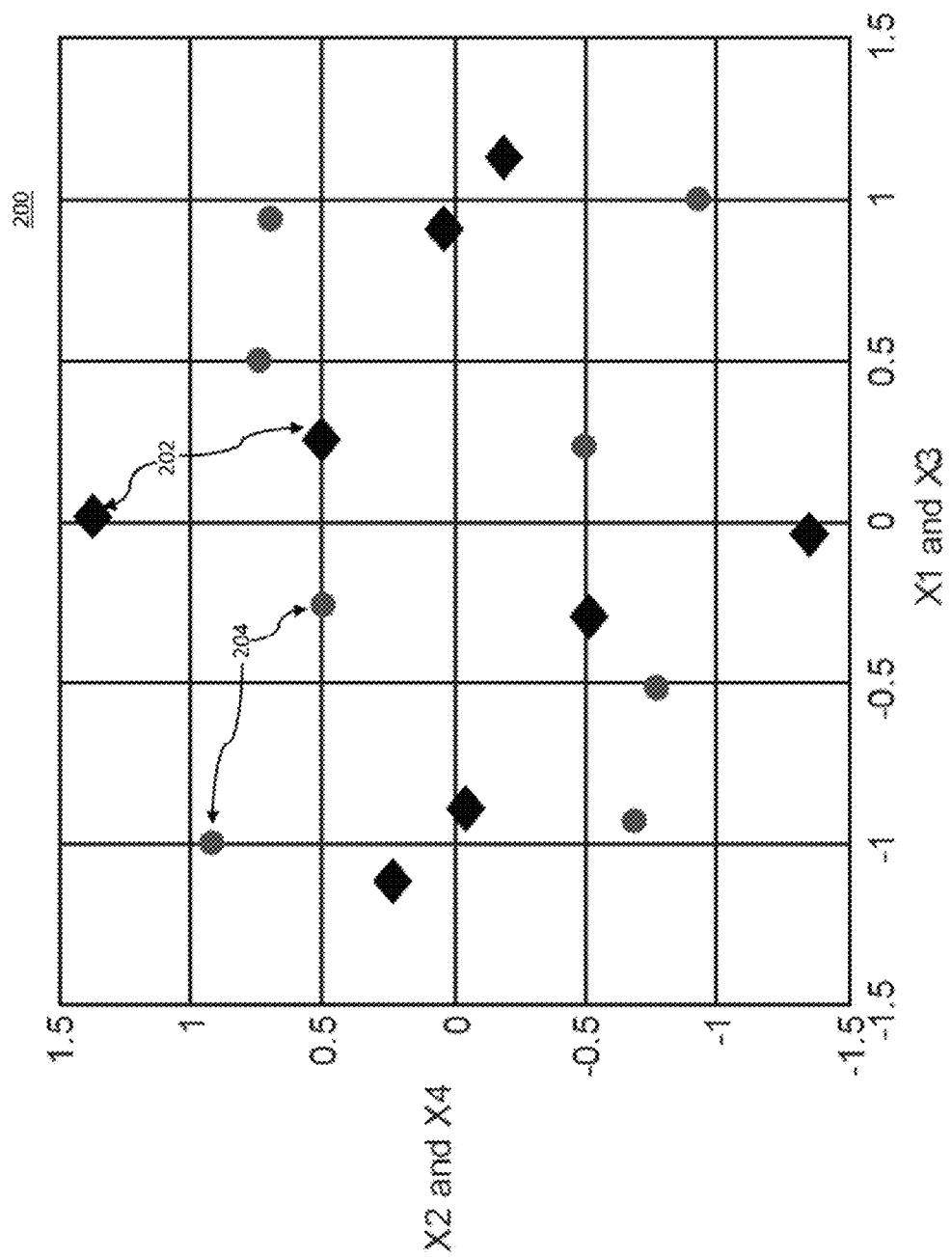
FIG. 2 is a diagram illustratively depicting a 8-ary 4-dimensional optical signal constellation design (4D-OSCD) constellation in accordance with an embodiment of the present principles.

Referring now to FIG. 2, a 8-ary 4-dimensional optimum signal constellation design (4D-OSCD) constellation 200 is illustratively depicted in accordance with one embodiment of the present principles, with each point represented with 4 coordinates (X1, X2, X3, X4). In one embodiment, the spherical-shaped points 204 represent a 2D projection of the even coordinates (i.e., X2 and X4), and the diamond-shaped points 202 represent the other two coordinates (i.e., X1 and X3). The points 202, 204 are symmetric and the energy of every point 202, 204 is the same.

One advantage of the present principles is that the D-dimensional signal constellation design may be employed for an arbitrary number of dimensions, and therefore may be applied in a plurality of optical channels (e.g., single-mode fiber (SMF), few-mode fiber (FMF), few-core fiber (FCF), few-core few-mode fiber (FCFMF). In one embodiment, the D-dimensional signal constellation design may be employed in, for example, polarization-division multiplexing systems for communication over SMF, and mode-multiplexed systems for communication over FMF, spatial/space division multiplexing for communication over few-core fiber (FCF) and FMFCF according to the present principles.

In one embodiment according to the present principles, LDPC-coded D-dimensional systems according to the present principles significantly outperform conventional multidimensional coded-modulation (CM) systems. For example, in one embodiment, the ND-OSCDs according to the present principles may be employed in a FMF system with a symbol rate of 25 GS/s, and a quasi-cyclic LDPC code may be employed as a channel code, and Monte Carlo simulations may be employed to precisely estimate the improvement in optical signal-to-noise ratio (OSNR) sensitivity with respect to conventional constellations. The BERs of the LDPC-coded ND-OSCDs according to the present principles outperform both corresponding M-ary QAMs and N-dimensional signal constellations obtained by conventional methods (e.g., sphere packing method).

For example, in one embodiment, a LDPC-coded PDM 16-ary 3D-OSCD according to the present principles outperforms a LDPC-coded PDM 16-QAM by 2.9 dB at BER of $10^{-7}$, and a PDM 64-ary 3D-OSCD according to the present principles outperforms a PDM 64-QAM by 2.92 dB at the same BER. In another embodiment, an 8-ary 4D-OSCD according to the present principles outperforms an 8-ary 4D constellation obtained by sphere packing by 0.36 dB (also at BER of $10^{-7}$).

Figure 3:
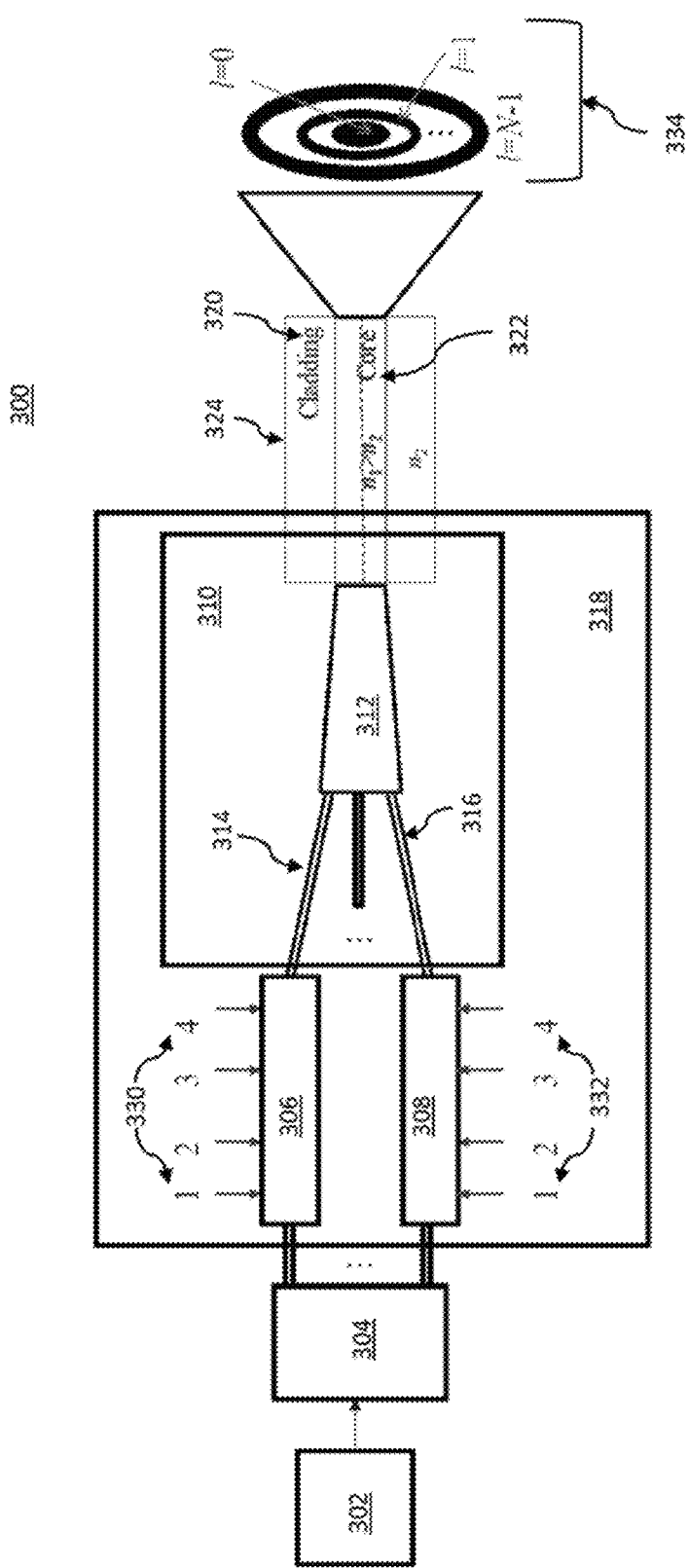
FIG. 3 is a block/flow diagram illustratively depicting an optical transmitter system/method for hybrid 4N dimensional low-density parity check (LDPC)-coded modulation for ultra-high-speed optical transmission in accordance with an embodiment of the present principles.

Referring now to FIG. 3, a 4N-dimensional transmitter architecture 300 is illustratively depicted according to one embodiment of the present principles. In one embodiment, D independent data streams may be LDPC encoded and codewords may be written into a block-interleaver row-wise. D bits may be taken from the block-interleaver column-wise and may be employed to select a point from a $2^D$-ary signal constellation which may be stored in a look up table (LUT). Coordinates 330, 332 from a LUT may be employed as inputs of a plurality of D-dimensional modulators 306, 308 (e.g., 4D modulator). In one embodiment, the 4N-dimensional modulator 318 may generate signal constellation points by $$s_i = C_D \sum_{d=1}^{D} \phi_{i,d} \Phi_d,$$

where $\phi_{i,d}$ denotes the dth coordinate (d=1, 2, ..., D) of the ith signal-constellation point, and the set $\{\Phi_1, \ldots, \Phi_D\}$ denotes basis functions. ($C_D$ is the normalization constant.) In one embodiment, the D-dimensional signal constellation is obtained by D-dimensional optimum signal constellation design.

In one embodiment according to the present principles, a laser diode signal 302 (e.g., CW laser diode) may be split into N branches by using a power splitter 304 to feed 4D modulators 306, 308 (e.g., electro-optical modulators), with each corresponding to one out of N OAM modes 314, 316 (i.e., channels). In one embodiment, the OAM modes 334 for radial number 0 are illustratively shown at the output of the fiber. The corresponding intensities may be proportional to $|l|^{1/2}$. The 4D modulators 306, 308 may include a polarization-beam splitter (PBS), two I/Q modulators and a polarization-beam combiner (PBC) (not shown). The OAM mode multiplexer 310 may include N channels 314, 316 (e.g., channel waveguides), taper-core fiber 312, and FMF 324; and may be designed to excite orthogonal OAM modes in FMF 324. In one embodiment, FMF 324 includes a core 322 and cladding 320. It should be understood that although the above transmitter configuration is illustratively depicted, it is contemplated that other sorts of configurations may also be employed according to the present principles.

Figure 4:
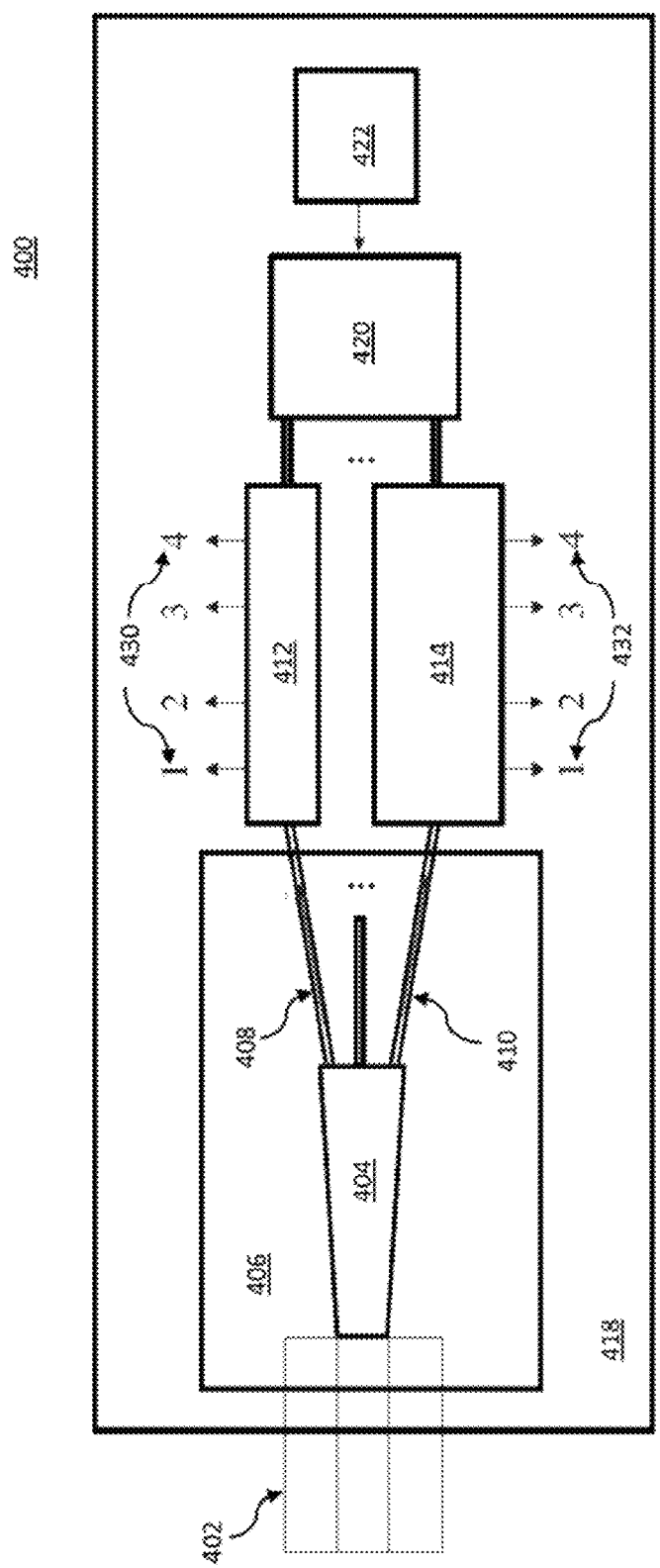
FIG. 4 is a block/flow diagram illustratively depicting an optical receiver system/method for hybrid 4N dimensional LDPC-coded modulation for ultra-high-speed optical transmission in accordance with an embodiment of the present principles.

Referring now to FIG. 4, a 4N-dimensional receiver architecture 400 is illustratively depicted according to one embodiment of the present principles. In one embodiment according to the present principles, a laser diode signal 422 (e.g., CW laser diode) may be split into N branches by using a power splitter 420 to feed 4D demodulators 412, 414 (e.g., electro-optical demodulators), with each corresponding to one out of N OAM modes 408, 410 (i.e., channels).

In one embodiment, an optical signal 402 (e.g., FMF) may be received and demultiplexed by an OAM mode demultiplexer 406, and the output may be 4D projections 430, 432. Each OAM mode may be demodulated and may undergo polarization-diversity coherent detection using demodulators 412, 414 (e.g., 4D demodulators), and corresponding outputs may be forwarded to an a posteriori probability (APP) demapper (not shown). In one embodiment, the OAM mode demultiplexer may include N channels 408, 410, FMF 402, and a taper-core 404. While the above receiver configuration is illustratively depicted according to the present principles, it is contemplated that other sorts of configurations may also be employed according to the present principles.

Figure 5:
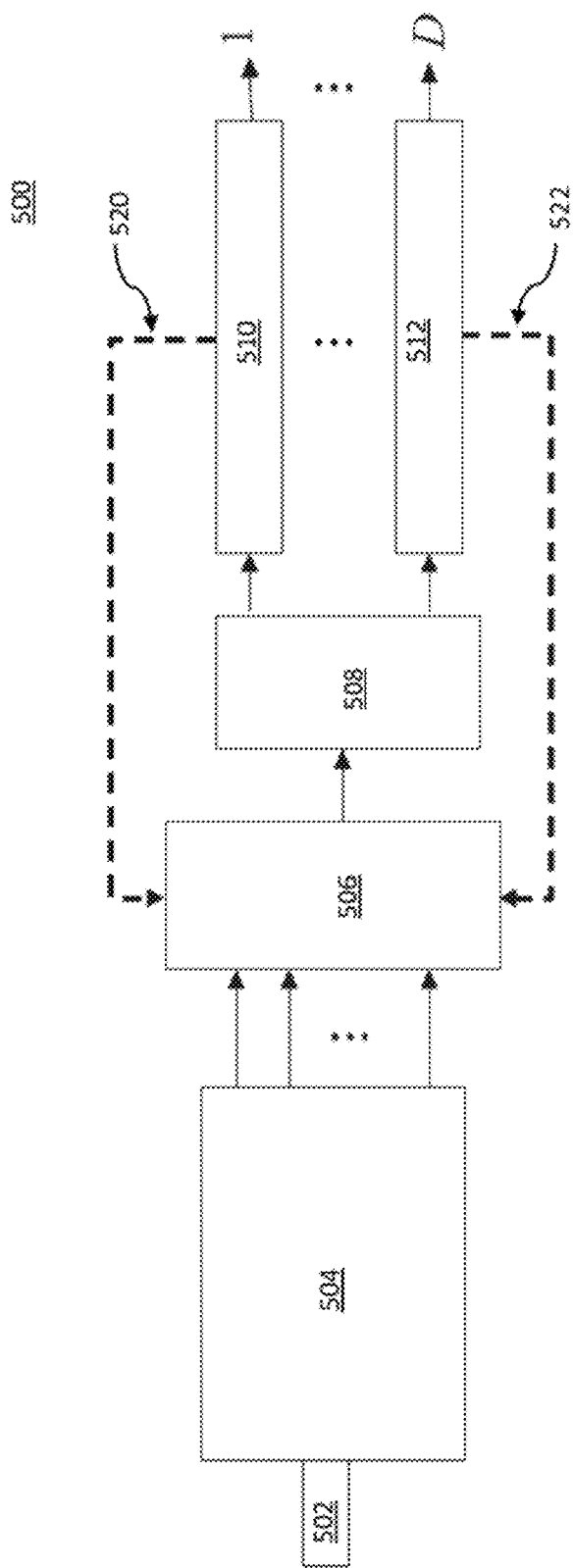
FIG. 5 is a block/flow diagram illustratively depicting a high-level overview of an optical system/method for receiving data using an a posteriori probability (APP) mapper and LDPC decoders for hybrid 4N dimensional LDPC-coded modulation for ultra-high-speed optical transmission in accordance with an embodiment of the present principles.

Referring now to FIG. 5, a high level overview of an optical system/method for receiving data 500 using a 4N-dimensional APP demapper 506 and LDPC decoders 510, 512 is depicted according to one embodiment of the present principles. In one embodiment, a signal may be received over an optical medium 502 (e.g., FMF), which may be demodulated by a 4N-dimensional demodulator 504. An a posteriori probability (APP) demapper 506 may be employed to calculate symbol log likelihood ratios (LLRs) (not shown). The calculated symbol LLRs may be employed to calculate bit LLRs in block 508, which may be employed for LDPC decoding using one or more LDPC decoders 510, 512. After LDPC decoding using LDPC decoders 510, 512, extrinsic bit LLRs 520, 522 may be employed to calculate prior symbol LLRs (not shown) for the APP demapper 506. While the above configuration is illustratively depicted, it is contemplated that other sorts of configurations may also be employed according to the present principles.

Figure 6:
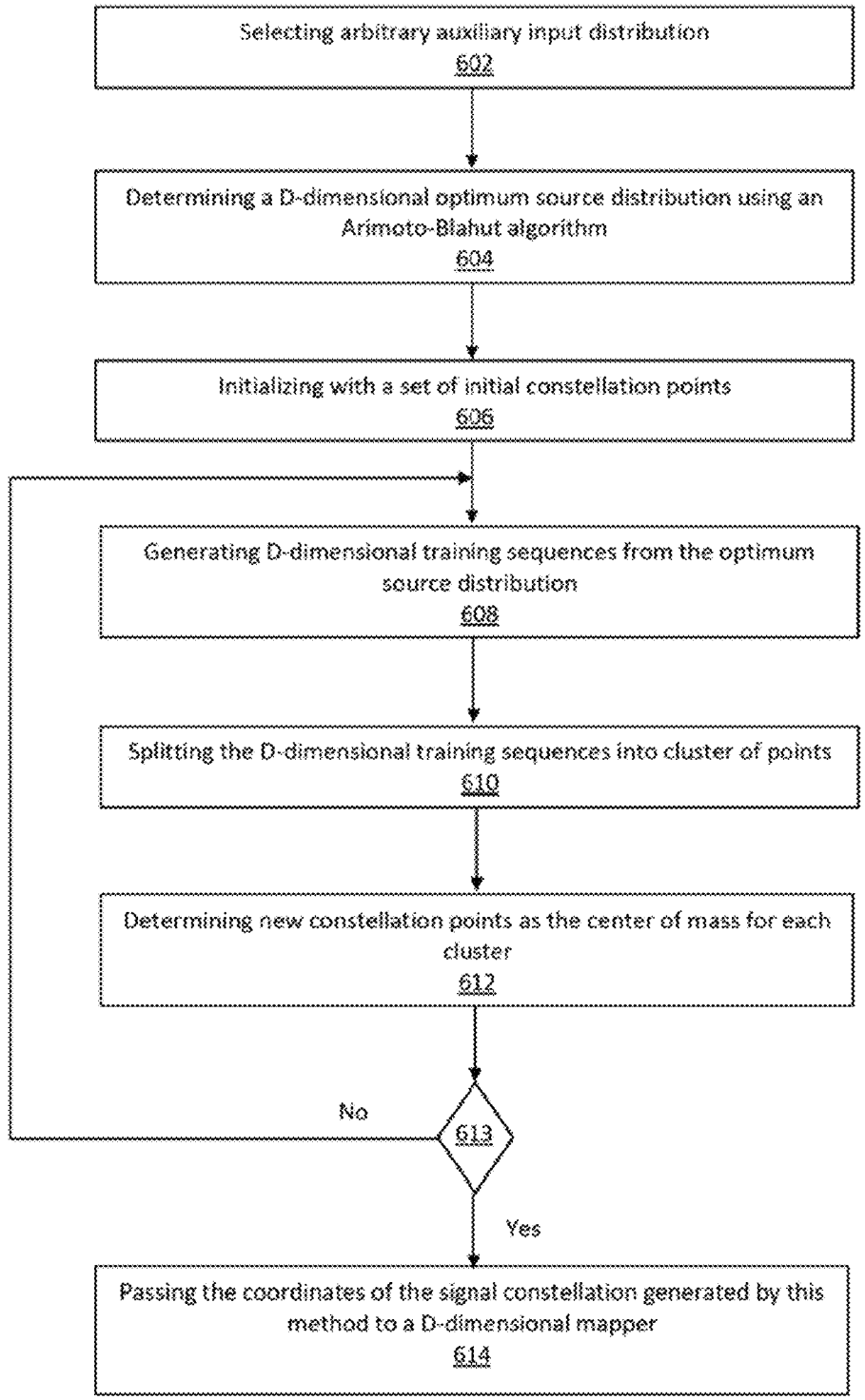
FIG. 6 is a block flow diagram illustratively depicting a D-dimensional OSCD method to obtain the D-dimensional constellation in accordance with an embodiment of the present principles.

Referring now to FIG. 6, a block/flow diagram illustratively depicting the D-dimensional OSCD method is provided according to one embodiment of the present principles. In block 602, an arbitrary auxiliary input distribution may be chosen. In block 604, a conventional Arimoto-Blahut algorithm may be employed to determine a D-dimensional optimum source distribution for a given optical channel. In one embodiment, the properties of the source distribution maximize channel capacity and may be employed to determine optimum source distribution. In block 606, the method according to the present principles may be initialized with a set of initial constellation points. For example, in one embodiment, constellations obtained by N-dimensional Cartesian product of pulse-amplitude modulation (PAM) may be employed for initialization. In another embodiment, a D-dimensional PAM may be chosen for initial points, and the constellation size may be set to M. In block 608, D-dimensional training sequences may be generated from the optimum source distribution.

In block 610, the D-dimensional training sequences, generated from optimum source distribution, may be split into clusters of points (e.g., MD-dimensional clusters). In one embodiment, the membership to the cluster may be decided based on Euclidean distance squared of sample point and signal constellation points from a previous iteration. Each sample point may be assigned to the cluster with the smallest Euclidean distance squared. In another embodiment, applicable to non-Gaussian channels, the membership to the cluster can be determined based on the maximum values of the likelihood function instead. In block 612, new constellation points may be determined as the center of mass for each cluster (e.g., D-dimensional cluster). A determination is made as to whether convergence or a predetermined number of iterations has been reached in decision block 613. If no, the steps 608, 610 and 612 may be repeated until convergence or until a predetermined number of iterations has been reached. If yes, the coordinates of the signal constellation obtained by this method may be passed to the D-dimensional mapper in block 614. In one embodiment, this method is optimum in the MMSE sense for Gaussian-like channels or maximum likelihood sense for non-Gaussian channels.

It should be recognized that the present principles are not limited to the particular embodiments described above. Rather, numerous other embodiments of the Multidimensional MMSE-optimum signal constellation design may also be employed in accordance with the present principles.

Having described preferred embodiments of a system and method for multidimensional coded modulation based on D-dimensional optimum signal constellation design (OSCD) (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for optical data transport, comprising:
    formulating a signal constellation using a D-dimensional optimum signal constellation design (OSCD) method, wherein D is an integer, the method comprising including:
    determining a D-dimensional optimum source distribution for a given optical channel using an Arimoto-Blahut algorithm;
    generating D-dimensional training sequences from the optimum source distribution, with the D-dimensional training sequences being split into D-dimensional clusters of points;
    determining new signal constellation points as the center of mass for each D-dimensional cluster of points; and
    repeating the formulating steps until convergence or until a predetermined number of iterations has been reached;
    encoding one or more streams of input data using one or more low density parity check (LDPC) encoders;
    mapping one or more encoded data streams to symbols, wherein a mapper is configured to assign bits of the symbols to one signal constellation and to associate the bits of the symbols with signal constellation points;
    generating signal constellation points using a D-dimensional optimum signal constellation design (OSCD) method,
    storing coordinates obtained by the D-dimensional OSCD method for a plurality of optical signal to noise ratio (OSNR) values in a look-up-table (LUT);
    selecting a point from the LUT using encoded data streams;
    inputting the coordinates into a D-dimensional modulator after digital-to-analog conversion (DAC); and
    transmitting a modulated signal over a fiber-optic medium of interest.

2. The method as recited in claim 1, wherein the D-dimensional OSCD is optimum in a minimum mean square error (MMSE) sense for Gaussian-like channels or maximum-likelihood for non-Gaussian channels.

3. The method as recited in claim 1, wherein the D-dimensional OSCD is applied to an arbitrary number of dimensions.

4. The method as recited in claim 1, wherein the new signal constellation developed by the D-dimensional OSCD method is applied in a plurality of types of optical channels, including at least one of single-mode fiber (SMF), few-mode fiber (FMF), few-core fiber (FCF), and few-core few-mode fiber (FCFMF).

5. The method as recited in claim 1, wherein the new signal constellation developed by the D-dimensional OSCD method is applied in at least one of polarization-division multiplexing (PDM) for communication over single-mode fiber (SMF), four-dimensional modulation for communication over SMF, mode multiplexing for communication over few-mode fiber (FMF), and spatial/space division multiplexing for communication over few-core fiber (FCF) and few-core few-mode fiber (FCFMF).

6. The method as recited in claim 1, wherein D bits are taken from a block-interleaver column-wise and used to select a point from a $2^D$-ary signal constellation stored in a look up table (LUT), with the coordinates from the LUT being used as inputs of a D-dimensional modulator.

7. The method as recited in claim 6, wherein the new signal constellation points are calculated using a D-dimensional modulator by:

$$S_i = C_D \sum_{d=1}^{D} \phi_{i,d} \Phi_d,$$

where $S_i$ denotes a signal constellation, $C_D$ denotes the normalization constant, $\phi_{i,d}$ denotes the dth coordinate (d=1, 2, ..., D) of the ith signal-constellation point (stored in LUT), and the set $\{\Phi_1, ..., \Phi_D\}$ denotes basis functions.

* * * * *